United States Patent Office 3,462,482
Patented Aug. 19, 1969

3,462,482
FLUOROPERHALOISOPROPYL BENZENE CARBOXYLIC ACIDS
Basil S. Farah, Elma, N.Y., and Everett E. Gilbert and Benjamin Veldhuis, Morristown, N.J., assignors to Allied Chemical Corporation, New York, N.Y., a corporation of New York
No Drawing. Filed Sept. 29, 1966, Ser. No. 583,069
Int. Cl. C07c 63/14
U.S. Cl. 260—515                  8 Claims

ABSTRACT OF THE DISCLOSURE

Mono and bis(fluoroperhaloisopropyl)benzene carboxylic acids useful as biocidally active agents.

---

This invention relates to new fluoroperhaloisopropyl benzene mono- and di-carboxylic acids useful as biocidally active agents.

The new compounds of our invention have the following general formula

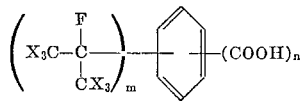

wherein X is fluorine or chlorine, at least 3 of the X substituents in each

radical being fluorine; $m$ and $n$ are integers of 1 or 2.

The new compounds of our invention can be prepared in three steps by (1) condensation of one or two moles of a fluoroperhaloacetone with one mole of a mono or dimethyl benzene in the presence of a Friedel-Crafts catalyst such as aluminum chloride, as described in J. Org. Chem. 30, 998 (1965); (2) reaction of the resultant mono- or dimethyl mono- or di(perhalohydroxyisopropyl) benzene with a fluorinating agent such as sulfur tetrafluoride to replace the hydroxyl group with fluorine; and (3) oxidizing the methyl group or groups to carboxyl group(s) by treatment with chromium trioxide in acidic reaction medium as illustrated by the equations below:

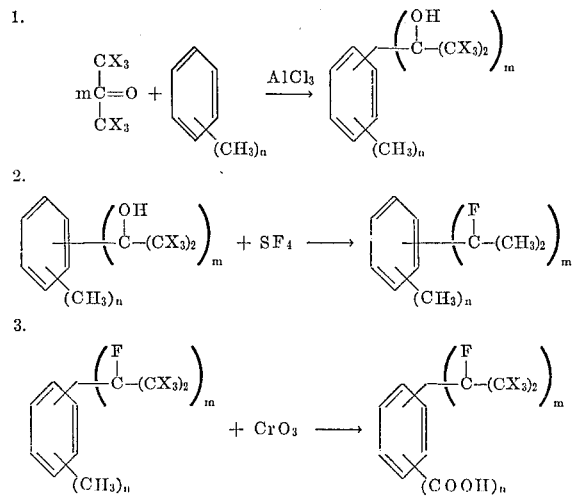

The preferred compounds of our invention are those wherein all the X groups in the formula are fluorine. Reaction number (1) gives diminishing yields as the chlorine content of the ketone is increased. With hexafluoracetone, reaction occurs rapidly and exothermally in the presence of a catalytic quantity of aluminum chloride to give good yields of the corresponding (2-hydroxy - hexafluoro-2-propyl) methyl benzenes. Reaction occurs less readily with pentafluoromonochloroacetone and tetrafluorodichloroacetone, and more than catalytic amounts of catalyst are required. Triflurotrichloroacetone gives only mediocre yields, and more highly chlorinated fluoroacetones produce no isolable products.

The compounds of our invention have biocidal activity and are useful in combatting various noxious pests, the compound of Example 5 being active in the control of nematodes (Panagrellus redivivus), that of Example 3 being selectively toxic to pea aphids. Our compounds are useful as chemical intermediates in the preparation of derivatives which in turn have specialized utility. Thus the reaction product of Example 1 with tionyl chloride, produces (4-heptafluoroisopropyl) benzoyl chloride which is active as an antifertility agent in the control of house flies and has ovicidal activity against mites with good residual effect.

The bifunctionality of the dicarboxylic acids of our invention make them useful in the preparation of polymers of the polyester and polyamide type.

When sulfonated, the compounds of our invention are useful as surface tension reducing agents.

In carrying out the preparation of our new compounds, reaction 1 is carried out by suspending aluminum chloride in toluene or xylene in an externally cooled reaction vessel. The fluoroperhaloacetone is admitted with stirring and cooling at below 20° C., at a rate as fast as it is absorbed as indicated by reflux. The reaction mixture is water washed, dried and distilled to recover the (2-hydroxy-hexahalo-2-propyl) toluene or xylene. One or two of the hydroxyhexahalopropyl groups are introduced into the benzene ring depending on reaction conditions, and proportions of reactants. A higher temperature (about 40° to 50° C.) and a larger amount of catalyst are required for the introduction of the second substituent. A third fluoroketone moiety apparently cannot be introduced by this technique.

Reaction No. 2 is carried out by sealing together in an autoclave the mono or bis-(hexahalo-2-hydroxy - 2-propyl) toluene or xylene with sulfur tetrafluoride in the ratio of one to two mole equivalents of SF$_4$ for each hydroxyl equivalent, between about —190° C. and about —40° C., and allowing the temperature of the mixture to rise over a 2 to 16 hour period to about 25° C. The pressure is then released, and the reaction product is recovered by pouring the mixture into water, separating the organic layer and distilling the mono or bis (heptahaloisopropyl) toluene or xylene.

Reaction 3 is carried out by dispersing the heptahaloisopropyl toluene or xylene in acid reaction medium, for example, a mixture of glacial acetic acid and concentrated sulfuric acid and adding chromium trioxide portionwise with stirring and cooling at about 5° C. to about 25° C. The mixture is then brought slowly to room temperature (ca. 25° C.), after which it is poured onto ice water to precipitate the solid mono or bis-(fluoroperhaloisopropyl) benzene mono or di-carboxylic acid. The precipitate is recovered as by filtration, dried and recrystallized if desired. The resulting acids are low melting solids.

The following specific example further illustrate our invention. Parts are by weight except as otherwise noted.

Example I

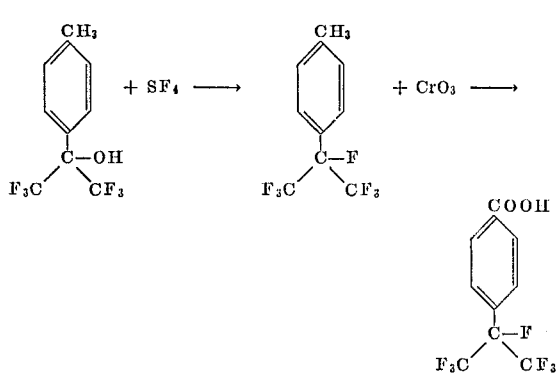

(A) One hundred twenty-nine grams (0.5 mole) of 4-(hexafluoro-2-hydroxy-2-propyl) toluene and 108 grams (1.0 mole) of sulfur tetrafluoride were sealed together in a stainless steel bomb at −190° C. and allowed to warm to room temperature (ca. 25° C.) overnight. The bomb was then vented and the contents poured in water, separated, water washed, and dried. The liquid product was distilled, yielding 100 gms. 4-heptafluoroisopropyl)toluene, boiling at 70° C. at 50 mm. Hg pressure, amounting to a yield of 77% of theory.

Anaylsis showed.—Theory: F, 51.2%. Found: F, 49.3%.

(B) Forty-one and six-tenths grams (0.16 mole) of the 4-(heptafluoroisopropyl) toluene obtained in (A) above, 1,200 ml. of glacial acetic acid and 152 ml. of concentrated (96%) $H_2SO_4$ were placed in a 200 ml., 3-necked reaction flask. Then 200 grams (1.32 moles) of chromium trioxide was added to the above mixture portionwise with stirring over a period of 1 hour 10 minutes, while maintaining the temperature at 15% C. by cooling. The resultant mixture was allowed to warm to room temperature (ca. 25° C.) with stirring, after which it was poured into one liter of ice water. A precipitate formed which was filtered and washed with four 100 ml. portions of water. The precipitate was air dried, and weighed, yielding 33 grams of crude 4-(heptafluoroisopropyl) benzoic acid. The crude acid was recrystallized from aqueous ethanol, producing a product with a melting point of 97°–99° C.

Examples 2–6

In a manner similar to that described in Example 1, the following methyl substituted (2-hydroxyhexafluoro-2-propyl) benzenes were converted into the corresponding carboxylic acids according to the equations shown below. The conditions and results are set forth in Tables I and II.

Example 2.—3-(hepafluoroisopropyl)-1,4-dicarboxylic acid

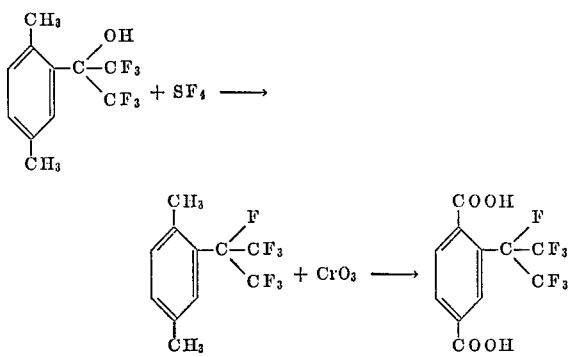

Example 3.—2,4-bis(heptafluoroisopropyl) benzoic acid

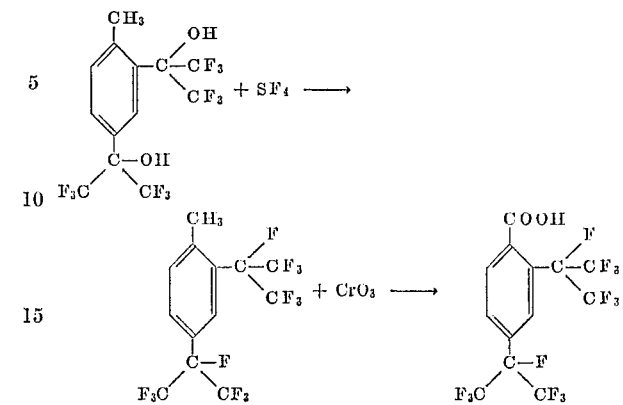

Example 4.—3,5-bis(heptafluoroisopropyl)-1,2-dicarboxylic acid

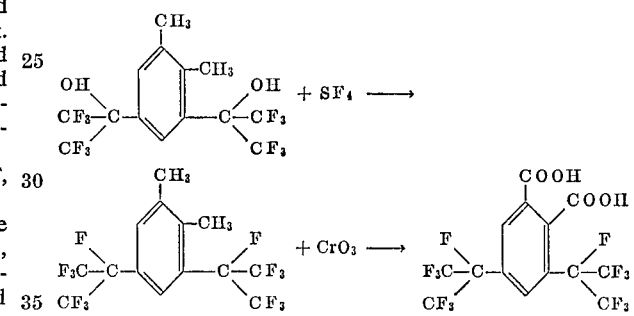

Example 5.—4,6-bis(heptafluoroisopropyl)-1,3-dicarboxylic acid

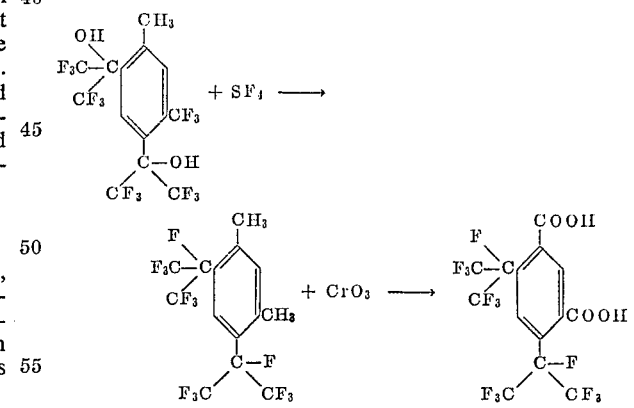

Example 6.—2,5-bis(heptafluoroisopropyl)-1,4-dicarboxylic acid

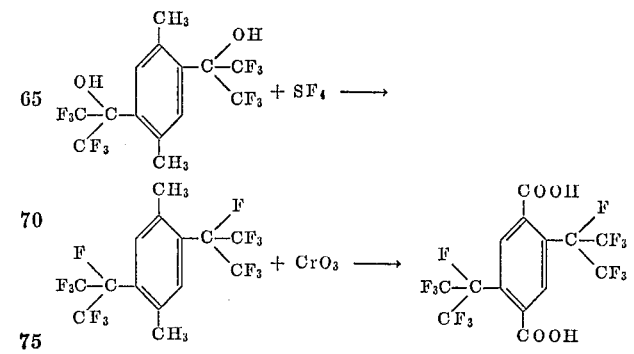

TABLE I.—FLUORINATION OF MONO- OR DI-METHYL MONO- OR DI-(PERFLUOROHYDROXYPROPYL) BENZENE TO CORRESPONDING METHYL (PERFLUOROPROPYL) BENZENE

| Example No. | Position(s) of $-C(CF_3)_2$ | Position(s) of $CH_3$ | Reagents | | | | Yield, percent | Boiling Point | |
|---|---|---|---|---|---|---|---|---|---|
| | | | Alcohol | | $SF_4$ | | | ° C. | Mm. Hg |
| | | | Gms. | Moles | Gms. | Moles | | | |
| 2A | 2 | 1.4 | 111 | 0.4 | 89 | 0.8 | 66 | 100 | 110 |
| 3A | 2.4 | 1 | 206 | 0.5 | 86 | 0.8 | 88 | 68 | 18 |
| 4A | 3.5 | 1.2 | 100 | 0.23 | 100 | 0.9 | 53 | 86 | 20 |
| 5A | 4.6 | 1.3 | 88 | 0.2 | 58 | 0.5 | 63 | 188 | 760 |
| 6A | 2.5 | 1.4 | 80 | 0.2 | 80 | 0.7 | 60 | Solid | |

TABLE II.—OXIDATION OF MONO- AND DI-METHYL-MONO AND DI(HEPTAFLUOROISOPROPYL) BENZENE TO CARBOXYLIC ACIDS

| Example No. | Position(s) of $-C(CF_3)_2$ | Position(s) of COOH | Reagents | | | | Yield, percent | M.P., ° C. (Purified) | Remarks |
|---|---|---|---|---|---|---|---|---|---|
| | | | Organic | | $CrO_3$ | | | | |
| | | | Gms. | Moles | Gms. | Moles | | | |
| 2B | 2 | 1.4 | 20 | 0.07 | 46 | 0.46 | 59 | 175 | |
| 3B | 2.4 | 1 | 51.4 | 0.12 | 105 | 1.05 | 92 | 103 | Analysis: Percent F.: Calc. 58.1; Found 57.4 |
| 4B | 3.5 | 1.2 | 20 | 0.05 | 100 | 1.00 | 20 | 165 | |
| 5B | 4.6 | 1.3 | 40 | 0.09 | 200 | 2.00 | 75 | 245 | Analysis: Percent F.; Calc. 53.0; Found 52.5 |
| 6B | 2.5 | 1.4 | 37 | 0.08 | 185 | 1.85 | 64 | subl. at 320 | |

Example 7.—Preparation of derivatives (A) 4-(Heptafluoroisopropyl) benzoic acid as prepared in Example 1, was mixed in the amount of 43.5 grams (0.15 mole) with 20.0 grams (0.168 mole) of thionyl chloride, with stirring, in a reaction vessel. Hydrogen chloride evolved as the temperature dropped to −10° C. The temperature was then raised in stages to 167° C. A distillation, performed at this point, followed by determination of the infrared spectrum, showed incomplete reaction; therefore 20 additional grams (0.17 mole) of thionyl chloride was added, and the resultant mixture was refluxed 6 hours at 81° C. The mixture was then distilled and yielded 24 grams (51% yield) of 4-(heptafluoroisopropyl) benzoyl chloride which had a boiling point of 75° C. at 10 mm. Hg. It has the following formula:

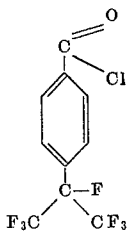

(B) Seven and seven tenths grams (0.025 mole) of the 4-(heptafluoroisopropyl) benzoyl chloride as prepared in Example 7(A) above, was placed in a reaction flask with 25 ml. of $CCl_4$ as reaction medium. Into the flask, 6.4 grams (0.050 mole) of 4-chloroaniline was introduced along with 85 ml. $CCl_4$ over an 8 minute period. An exothermic reaction occurred raising the temperature to 46° C. The mixture was then brought to room temperature and stirred at that temperature for 2½ hours, whereupon solid 4-chloroaniline formed as a by-product and was removed by filtration and washed. The remaining solution containing the 4-(heptafluoroisopropyl)-benz-4-chloroanilide was purified by refluxing with decolorizing carbon, and concentrated and filtered to give 8.3 grams, 73% yields of crystals of pure product, melting at 141°–141.5° C.

Example 8

The 4-(heptafluoroisopropyl)-benz-4-chloroanilide prepared in 7(B) was formulated as a wettable powder containing 25% of the chloroanilide and tested as a mite ovicide as follows.

Young cranberry bean plants in 2½-inch pots were infested with two-spotted spider mites in all stages. One day after infestation, the plants were treated with a suspension of 2 pounds per 100 gallons of the above 25% wettable power, by spraying in standard manner from an atomizer nozzle operated at 20 p.s.i. with the plant about 18 inches from the nozzle, thus delivering a volume of spray of about 0.6 cc./second depositing about .002 cc. of spray fluid per square centimeter per second. The treated plants were examined after 7 days and were found to be substantially free of mite eggs. The compound was evaluated as a fair ovicide with fair-to-good residual action.

Example 9

The 2,4-bis(heptafluoroisopropyl)-benzoic acid of Example 3 was tested as a toxicant for control of pea aphid adults (*Macrosiphum pisi*) by dissolving it in acetone and dispersing the acetone in equal parts water to provide a mixture containing 2 pounds of toxicant per 100 gallons of a 1:1 by volume mixture of acetone and water.

The toxicant solution above was sprayed onto English broadleaf bean plants for 2 seconds on the upper surface and 5 seconds on the under surface. Adult female aphids (10 per test) were brushed from infested broad bean plants into 5 inch screen wire hemispheres and sprayed for 5 seconds (approximately 0.6 cc. delivery per second). Following treatment aphids were caged over previously sprayed plants. Treated plants were observed 3 days after spraying at which time all aphids were dead, having sustained 100% mortality from the toxicant.

Example 10

The 4,6-bis(heptafluoroisopropyl)-1,3-dicarboxylic acid of Example 5 was tested as a toxicant for control of nematodes (*Panagrellus redivivus*) by dissolving the toxicant in acetone (4.8 grams/100 ml.) and diluting the solution with water to provide a 1% solution (1,000 parts per million) of toxicant. Into each of three (2″ by ¾″) petri dishes were placed 5 ml. of the toxicant solution. Approximately 100 nematode worms were placed into each solution. The dishes were held in a dark room at temperatures of 75° to 80° F. Observation of the worms was made after 3 days, at which time all worms were dead and there were no surviving young, indicating that a 100% mortality effect against the organisms was provided by the acid.

While the above describes the preferred embodiments of our invention, it will be understood that departures can be made therefrom within the scope of the specification and claims.

We claim:
1. As new compounds, fluoroperhaloisopropyl benzene carboxylic acids of the formula

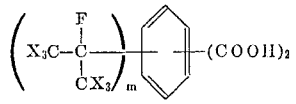

wherein X is fluorine or chlorine, at least 3 of the X substituents in each

radical being fluorine; $m$ is an integer of 1 or 2.
2. The compounds of claim 1 wherein all X substituents are fluorine.
3. The compounds of claim 2 wherein $m$ is 1.
4. The compounds of claim 2 wherein $m$ is 2.
5. 2-(Heptafluoroisopropyl)benzene-1,4 - dicarboxylic acid.
6. 3,5-Bis(heptafluoroisopropyl)benzene-1,2 - dicarboxylic acid.
7. 4,6-(Bis(heptafluoroisopropyl)benzene-1,3 - dicarboxylic acid.
8. 2,5-Bis(heptafluoroisopropyl)benzene-1,4 - dicarboxylic acid.

References Cited

UNITED STATES PATENTS 2,724,643  11/1955  Morris et al. _____ 280—515

OTHER REFERENCES

Sheppard: J. Am. Chem. Soc., vol. 87, pp. 2410–2420.

LORRAINE A. WEINBERGER, Primary Examiner

M. G. BERGER, Assistant Examiner

U.S. Cl. X.R.

260—524, 544, 558, 618, 651; 424—315, 317, 324